UNITED STATES PATENT OFFICE 2,550,737

INSECTICIDAL COMPOSITION CONTAINING PYRETHRINS AND A SYNERGIST THEREFOR

Herman Wachs, Brooklyn, N. Y., assignor to U. S. Industrial Chemicals, Inc., New York, N. Y., a corporation of Delaware No Drawing. Application February 21, 1949, Serial No. 77,686

10 Claims. (Cl. 167—24)

This invention relates to insecticidal compositions containing pyrethrins and a synergist therefor.

Out of all the insecticide materials in use, the one which approaches most nearly the ideal is pyrethrum flowers—or, rather, the active insecticidal principle, pyrethrins, which appear in the pyrethrum flowers. Pyrethrins are immediately toxic to a very great number of insect pests at different concentrations varying with the resistance of the insects mentioned. Also they are substantially non-toxic to animals and plants.

The endeavor to extend the usefulness of pyrethrins by increasing their effectiveness and lowering their cost has led to extensive research on another class of insecticide materials customarily referred to as synergists. As the word synergists is generally understood, such may or may not have appreciable insecticidal value when used by themselves, but when used in combination with suitable quantities of some other insecticidal substance such as pyrethrins, the resultant insecticide has an effectiveness appreciably greater than would be calculated from the sum total of its constituents. It may be said that synergism or synergistic action has occurred when the above condition is met.

The mechanism of synergism is by no means understood on the basis of present knowledge. It is not only possible but probable, that it differs in the case of different synergistic combinations.

The application of synergists in the problems connected with pyrethrum insecticides has received particular attention both because of the recognizably unique value of pyrethrins and because their relatively high cost has encouraged study of methods to extend their usefulness and reduce the cost of insecticides made from them. Many substances have been found possessing more or less synergistic value when used with pyrethrins, but these known synergists are, so far as I am aware, deficient in two important respects. First, while their use does extend the killing power of the pyrethrins and permits effective insecticides to be made having lower pyrethrin content than would otherwise be the case, it is still necessary that the pyrethrin content be substantially high. Secondly, these synergists have displayed marked specificity in that while they may increase the killing power of pyrethrins against some varieties of insects to a marked extent, they have been found to be relatively ineffective in the case of other and more numerous varieties of insects.

The foregoing being in brief the state of the art, it is therefore an object of the present invention to provide a novel insecticidal composition containing pyrethrins and a synergist therefor, the composition being substantially non-toxic and non-injurious to both animals and plants, at least to an extent which permits their practically unrestricted use.

It is also an object of the present invention to provide such compositions which may contain a relatively small percentage of pyrethrins without loss of efficiency, and in some instances with a considerable gain in efficiency.

It is a further object of this invention to provide such compositions which are markedly superior in their freedom from specificity.

The foregoing and other objects are accomplished in accordance with the present invention by preparing a composition containing pyrethrins and as a synergist therefor a compound of the generic formula:

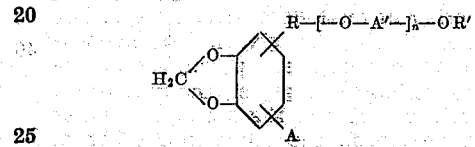

in which R is a saturated, bivalent, aliphatic, hydrocarbon radical, A is the hydrogen atom or an alkyl radical, R' is an alkyl, cycloalkyl, aralkyl, aryl or heterocyclic radical, A' is a saturated, bivalent, aliphatic, hydrocarbon radical having from two to three carbon atoms and $n$ is an integer from one to three.

Thus, in the preceding generic formula, R may be, for example, the methylene radical; A may be, for example, the methyl, ethyl, n-propyl, etc. radical; R' may be, for example, the methyl, ethyl, n-propyl, i-propyl, n-butyl, tert.-butyl, n-hexyl, cyclohexyl, phenyl, o-tolyl, m-tolyl, p-tolyl, benzyl, tetrahydrofurfuryl, etc. radical; and A' may be, for example, the ethylene, propylene, etc. radical. The compounds of the aforementioned generic formula may be prepared as is described in my copending application, Serial No. 729,883, filed February 20, 1947, Patent No. 2,485,681, of which application the present application is a continuation-in-part.

For example, the compounds of the above generic formula may be prepared by the reaction of a halide (e. g., a chloride) of the generic formula:

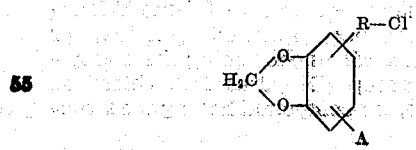

in which R and A have the significance given above, with the sodium salt of a glycol ether or polyglycol ether having the generic formula.

$$Na—[—O—A'—]n—OR'$$

in which A', A' and $n$ have the meaning above indicated; or by the reaction of the sodium salt of the hydroxide of a compound having the generic formula.

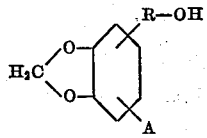

with a halide (e. g., a chloride) having the generic formula $$Cl—[—A'—O—]n—R'$$

In conducting both of the aforementioned reactions, a sodium halide (e. g., sodium chloride) is formed in addition to the synergist used in accordance with the present invention.

The monoglycol or polyglycol ethers, used in the preceding reactions in the form of their halides or sodium salts in making the synergist, include ethers of monoethylene glycols and polyethylene glycols, as well as higher alkylene monoglycols and polyglycols and include the monomethyl ether of monoethylene gylcol, the monoethyl ether of monoethylene glycol, the mono-n-butyl ether of monoethylene glycol, the monophenyl ether of monoethylene glycol, the 2-ethylbutyl ether of monoethylene glycol, the monomethyl ether of diethylene glycol, the monoethyl ether of diethylene glycol, the mono-n-butyl ether of ethylene glycol, the mono-2-ethylbutyl ether of diethylene glycol, the monoethyl ether of triethylene glycol, the monoethyl ether of propylene glycol, the monobutyl ether of dipropylene glycol, the monobutyl ether of di-trimethylene glycol, etc.

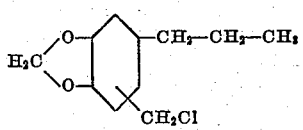

The chlorides or other halides containing the methylenedioxyphenyl radical include the chloromethyl derivative of dihydrosafrol

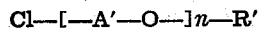

which may be prepared as described in my copending application, Serial No. 658,872, filed April 1, 1946, Patent No. 2,485,680; isosafrol hydrochloride or 1-(3,4-methylenedioxyphenyl)-1-chloropropane; 1-bromo-3-(3,4-methylenedioxyphenyl)-propane; piperonyl bromide; or other halogen derivatives containing the methylenedioxyphenyl group. Dihydrosafrol, which was mentioned above, is a compound having the structural formula.

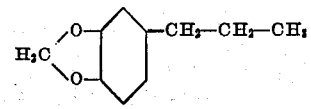

as described in Beilstein 19, 27 (1934).
Alcohols having the generic formula

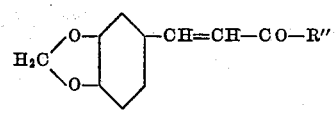

in which R'' is an alkyl group, such as the n-propyl, n-butyl, n-hexyl, 2-ethylhexyl, etc. radical, or a cycloalkyl group, such as the cyclohexyl radical, can be prepared by reduction of the unsaturated ketones of the generic formula

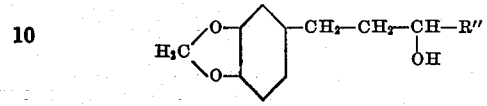

which ketones can be prepared by reacting piperonal with a methyl alkyl ketone containing two or more carbon atoms in the alkyl group in the presence of caustic soda. These unsaturated ketones, upon hydrogenation, yield alcohols which can be used in the form of their sodium salts for reaction with the chloride of the glycol or polyglycol ethers to form a compound which may suitably be used as a synergist for pyrethrins.

The invention will be further illustrated by the following specific examples, but the invention is not limited thereto.

*Example I*

A particularly valuable product for use as a synergist for pyrethrins is obtained when a chloromethyl derivative of dihydrosafrol is reacted with the sodium salt of the mono-n-butyl ether of diethylene glycol to form an ether derivative as illustrated by the following equation:

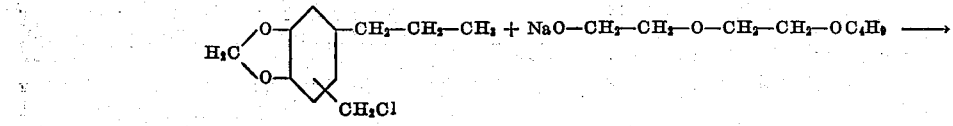

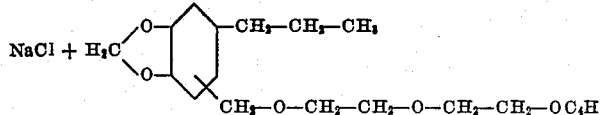

The preparation of the synergist is illustrated by the following example:

22 parts of sodium hydroxide pellets were added to 162 parts of the mono-n-butyl ether of diethylene glycol in 90 parts of benzene, and the mixture was refluxed using a water trap until no more water was collected (approximately 18 hours).

The solution was cooled, and under continued cooling 106 parts of chloromethyl dihydrosafrol in 45 parts of benzene were added. After standing overnight, the mixture was refluxed for four hours. The pellet which separated was removed by washing with water, the separated benzene solution was dried, and the benzene was distilled off. The remaining oil was thereafter distilled under a vacuum. During the vacuum distillation, some of the excess mono-n-butyl ether of diethylene glycol distilled over first, after which the final product distilled at about 195° C. at 2 mm. of mercury pressure. The product was a colorless oil, soluble in benzene, isopropyl alcohol and most organic solvents.

The resulting product was a valuable synergist for pyrethrins. When used with pyrethrins in the proportions of 30 mg. of pyrethrins and 300 mg. of the synergist dissolved in 100 ml. of odorless kerosene, an insect spray was produced which gave practically complete knockdown and kill of flies.

*Example II*

Instead of using the sodium salt of the mono-n-butyl ether of diethylene glycol as in Example I, an equivalent amount of the sodium salt of the monoethyl ether of diethylene glycol was used in a similar way to produce a synergist boiling at 162–185° C. at 2 mm. of mercury pressure. At a concentration of 300 mg. of synergist and 30 mg. of pyrethrins in 100 ml. of odorless kerosene, a knockdown of 94% and a kill of 76% were obtained, while the official test insecticide (O. T. I.) gave a knockdown of 94% and a kill of 43%.

*Example III*

Instead of using the sodium salt of the mono-n-butyl ether of diethylene glycol as in Example I, an equivalent amount of the sodium salt of the mono-n-butyl ether of ethylene glycol was used, and the resulting synergist boiled at about 167° C. at 2 mm. of mercury pressure. 1,000 mg. of this product and 30 mg. of pyrethrins dissolved in 100 ml. of odorless kerosene gave a knockdown of 96% and a kill of 86% in the Peet-Grady test, while the O. T. I. was 96% and 54%, respectively.

*Example IV*

Instead of using the sodium salt of the mono-n-butyl ether of diethylene glycol as in Example I, an equivalent amount of the sodium salt of the monobenzyl ether of monoethylene glycol was used, yielding a synergist boiling at 195–205° C. at 1.5 mm. of mercury pressure. 300 mg. of this product and 30 mg. of pyrethrins in 100 ml. of odorless kerosene gave a knockdown of 98% and a kill of 76%, the O. T. I. giving 96% and 54%, respectively.

*Example V*

Instead of using the sodium salt of the mono-n-butyl ether of diethylene glycol as in Example I, an equivalent amount of the sodium salt of the monomethyl ether of diethylene glycol was used, giving a synergist boiling at 168° C. at 0.4 mm. of mercury pressure. 300 mg. of this product and 30 mg. of pyrethrins in 100 ml. of odorless kerosene gave a knockdown of 99% and a kill of 94%, while the O. T. I. was 99% and 54%, respectively.

*Example VI*

61 parts of the mono-n-butyl ether of diethylene glycol was dissolved in 45 parts of benzene. 11 parts of sodium hydroxide pellets were added, and the mixture was refluxed using a water trap condenser until no more water would collect (boiling overnight was sufficient). The benzene solution was then cooled, and under continued cooling with ice water 49.5 parts of isosafrol hydrochloride (1-(3,4-methyl-enedixoyphenyl)-1-chloropropane) in 45 parts of benzene was added. After standing overnight, the mixture was refluxed for four hours. The mixture was then washed with water to remove the sodium chloride formed, after which the benzene was distilled off and the remaining product was distilled using a vacuum. The final product boiled at 210–216° C. at 7 mm. of mercury pressure.

A solution of 300 mg. of this product and 30 mg. of pyrethrins dissolved in 100 ml. of deodorized kerosene gave a knockdown of 97% in 10 minutes and a kill of 97%. The marked synergistic effect of the synergist is indicated by the fact that a solution of 30 mg. of pyrethrins in 100 ml. of deodorized kerosene gave a kill of less than 20%, while a solution containing 300 mg. of the synergist in 100 ml. of kerosene gave practically no knockdown.

*Example VII*

28.5 parts of monomethyl ether of monoethylene glycol was dissolved in 45 parts of benzene, 17 parts of sodium hydroxide pellets were added and this mixture was refluxed using a water trap condenser until no more water would collect. The benzene solution was cooled, and under cooling with ice water 49.5 parts of isosafrol hydrochloride in 45 parts of benzene was added. After standing overnight, the mixture was refluxed for four hours, was washed with water to remove the sodium chloride formed, the benzene was distilled off, and the remaining product was distilled using a vacuum. The final product boiled at 165–168° C. at 1.5 mm. of mercury pressure.

300 mg. of this product and 30 mg. of pyrethrins in 100 ml. of deodorized kerosene gave a knockdown of 99% and a kill of 88% when tested according to the Peet-Grady method.

*Example VIII*

In the manner described for Example I, the sodium salt of the monobenzyl ether of monoethylene glycol was reacted with isosafrol hydrochloride to produce the corresponding ether which was a liquid boiling at 182–192° C. at 2 mm. of mercury pressure.

When tested in the Peet-Grady Chamber using a concentration of 300 mg. of the synergist and 30 mg. of pyrethrins in 100 ml. of odorless kerosene, the solution showed a knockdown of 98% and a kill of 76%.

The synergist mixture of the present invention is readily soluble in liquids of the "Freon" type, such as "Freon 12," methyl chloride, etc., which are gases at ordinary pressures and are used as propellants for insecticides. The following example will illustrate the effectiveness of such solutions.

*Example IX*

A solution containing 600 mg. of pyrethrins under certain test conditions gave a knockdown of approximately 85% in 10 minutes and a kill of 46%. A similar solution containing 600 mg. of pyrethrins and 1000 mg. of the synergist described in Example VI above gave a knockdown of 97.5% and a kill of 97.5%.

The synergistic mixture may also be used as the active ingredient of insecticidal dusts. Thus, a dust base containing 2.5% of the synergist and 0.2% of pyrethrins may be prepared by incorporating the required ingredients into a carrier, such as exhausted pyrethrin flowers (a by-product of the pyrethrin extract manufacture). This dust base may be further diluted with three or four parts of an inert carrier, such as talc, and the resulting dust is active against a wide variety of insects.

Example X

Piperonyl bromide was reacted with the sodium salt of the monomethyl ether of ethylene glycol to yield a liquid boiling at 142.5–144.5° C. at 3.7 mm. of mercury pressure. 300 mg. of this product and 30 mg. of pyrethrins dissolved in 100 ml. of odorless kerosene showed a kill of 43% in the Peet-Grady Chamber, as compared with a kill of 52% for the O. T. I. While this result is considerably poorer than the results obtained with many of the other synergists employed in accordance with the present invention, the result nevertheless definitely shows that the synergist adds considerably to the insecticidal activity of the pyrethrins.

Example XI

Piperonyl bromide was reacted with the sodium salt of the mono-n-butyl ether of diethylene glycol to yield a product which was a liquid boiling at 200–205° C. at 5 mm. of mercury pressure. 300 mg. of this product and 30 mg. of pyrethrins dissolved in 100 ml. of odorless kerosene showed a kill of 92%, as compared with a kill of 52% for the O. T. I.

Example XII

Piperonyl bromide was reacted with the sodium salt of the monophenyl ether of monoethylene glycol to yield a product which was a liquid boiling at 167° C. at 0.4 mm. of mercury pressure. 300 mg. of this product and 30 mg. of pyrethrins in 100 ml. of odorless kerosene gave a kill of 46%, as compared with a kill of 52% for the O. T. I.

Example XIII 1-(3,4- methylenedioxyphenyl) - 3 - bromopropane was reacted with the sodium salt of the mono-n-butyl ether of monoethylene glycol to yield a product which boiled at 165–171° C. at 0.7 mm. of mercury pressure. 300 mg. of this product and 30 mg. of pyrethrins in 100 ml. of odorless kerosene gave a kill of 90.5%, as compared with a kill of 52% for the O. T. I.

Example XIV

In Example XIII, the mono-n-butyl ether of diethylene glycol was substituted for the mono-n-butyl ether of monoethylene glycol. The product boiled at 182° C. at 0.7 mm. of mercury pressure. 300 mg. of the product and 30 mg. of pyrethrins in 100 ml. of odorless kerosene gave a kill of 92%, as compared with a kill of 52% for the O. T. I.

Reference is made to my copending application Serial No. 688,967, filed August 7, 1946, later formally abandoned.

I claim:

1. An insecticidal composition comprising pyrethrins and as a synergist therefor a compound of the generic formula $$H_2C\diagdown_{O-}^{O-}\diagup\hspace{-0.5em}\bigcirc\hspace{-0.5em}\diagdown_{A}^{R-[-O-A'-]_n-OR'}$$

in which R is a saturated, bivalent, aliphatic, hydrocarbon radical, A is a substituent selected from the group consisting of the hydrogen atom and alkyl radicals, R' is a substituent selected from the group consisting of alkyl, cycloalkyl, aralkyl, aryl and heterocyclic radicals, A' is a saturated, bivalent, aliphatic, hydrocarbon radical having from two to three carbon atoms and $n$ is an integer from one to three.

2. An insecticidal composition comprising pyrethrins and as a synergist therefor a compound of the generic formula $$H_2C\diagdown_{O-}^{O-}\diagup\hspace{-0.5em}\bigcirc\hspace{-0.5em}-CH_2-[-O-(CH_2)_2-]_n-OR'$$

in which R' is a substituent selected from the group consisting of alkyl, cycloalkyl, aralkyl, aryl and heterocyclic radicals, and $n$ is an integer from one to three.

3. An insecticidal composition as in claim 2 in which R' is an alkyl radical.

4. An insecticidal composition as in claim 2 in which R' is the n-butyl radical and $n$ is two.

5. An insecticidal composition comprising pyrethrins and as a synergist therefor a compound of the generic formula $$H_2C\diagdown_{O-}^{O-}\diagup\hspace{-0.5em}\bigcirc\hspace{-0.5em}\diagdown_{CH_2-[-O-(CH_2)_2-]_n-OR'}^{-CH_2-CH_2-CH_3}$$

in which R' is a substituent selected from the group consisting of alkyl, cycloalkyl, aralkyl, aryl and heterocyclic radicals, and $n$ is an integer from one to three.

6. An insecticidal composition as in claim 5 in which R' is an alkyl radical.

7. An insecticidal composition as in claim 5 in which R' is the n-butyl radical and $n$ is two.

8. An insecticidal composition comprising pyrethrins and as a synergist therefor a compound of the generic formula $$H_2C\diagdown_{O-}^{O-}\diagup\hspace{-0.5em}\bigcirc\hspace{-0.5em}-\underset{\underset{CH_3}{\overset{|}{CH_3}}}{\overset{|}{CH}}-[-O-(CH_2)_2-]_n-OR'$$

in which R' is a substituent selected from the group consisting of alkyl, cycloalkyl, aralkyl, aryl and heterocyclic radicals, and $n$ is an integer from one to three.

9. An insecticidal composition as in claim 8 in which R' is an alkyl radical.

10. An insecticidal composition as in claim 8 in which R' is the n-butyl radical and $n$ is two.

HERMAN WACHS.

REFERENCES CITED

The following references are of record in the file of this patent:

UNITED STATES PATENTS

| Number | Name | Date |
|---|---|---|
| 2,421,569 | La Forge et al. | June 3, 1947 |
| 2,431,844 | Synerholm | Dec. 2, 1947 |
| 2,452,188 | Hedenburg | Oct. 26, 1948 |
| 2,457,957 | Wachs | Jan. 4, 1949 |